Patented June 6, 1944

2,350,584

UNITED STATES PATENT OFFICE 2,350,584

FURFURAL PURIFICATION METHOD

Charles Keith Buell, Bartlesville, Okla., and Carl Major Cooper, Cincinnati, Ohio, assignors to Phillips Petroleum Company, a corporation of Delaware Application September 28, 1942, Serial No. 460,004

10 Claims. (Cl. 202—73)

This invention relates to a method whereby furfural or furfural containing small percentages of water may be separated from furfural polymer by a combination of fractionation and steam distillation without subjecting the furfural and polymer to temperatures and pressures which would tend to decompose the furfural or rapidly accelerate further polymer formation.

Furfural has become an important solvent extraction agent for the recovery of butadiene from mixed hydrocarbon streams. In such service and in storage, the furfural tends to polymerize gradually. If the polymer is not frequently removed it increases to objectionable concentrations in the system. In solvent extraction service various other diluents besides polymer accumulate in the furfural. These come from the hydrocarbon stream being treated and they tend to lower the effectiveness of the furfural as a solvent. Consequently, it is necessary that these diluents be removed frequently to keep their concentration as low as possible. This invention is particularly applicable to the purification of furfural used in connection with such processes.

Ordinary distillation of furfural to separate it from heavier polymer-like impurities can be carried on quite successfully at relatively high temperatures without appreciable decomposition or further polymer formation occurring provided the polymer concentration is relatively low. This is partially because (1) polymer in high concentration catalyzes furfural polymerization, (2) polymer deposits on the heating elements and insulates them and thus promotes overheating, and (3) the boiling point of the furfural-polymer mixture is lower when the concentration of furfural is high with respect to the polymer concentration than when it is low with respect to the polymer concentration. Consequently, when the furfural concentration is high the boiling temperature of the mixture is below the temperature for furfural decomposition or rapid polymer formation. However, as the furfural concentration is decreased to lower and lower values by distillation the boiling temperature of the furfural-polymer mixture increases. This results in a simultaneous increase in the rate of furfural polymerization and may even result in furfural decomposition. Consequently, several per cent of furfural is lost. This invention provides a means for overcoming this difficulty.

Accordingly, the principal object of the present invention is to provide an improved process of recovering furfural from admixture with furfural polymer. Another object is to provide such a process in which decomposition of furfural and further polymerization of furfural are prevented. Another object is to provide such a process especially adapted to use for the continuous re-running and recovery of furfural used in the extraction of butadiene from hydrocarbon streams containing same. Another object is to provide such a process which is economical to operate and requires a minimum of power and consumption of chemicals, and carried out in equipment adapted to operate for a long period of time, in fact practically indefinitely, without interruptions. Numerous other objects will hereinafter appear.

In the accompanying drawings.

In the copending application of K. H. Hachmuth, Ser. No. 438,844, filed April 13, 1942, it is disclosed that the selectivity of furfural for olefins and diolefins is not decreased, but slightly increased, by the addition of small amounts of water.

It has been found that small amounts of water also aid greatly in purifying the furfural because the boiling temperature of the furfural-polymer mixtures is thereby appreciably reduced, thus serving to reduce the amount of decomposition and polymer formation in the purification step. The steps employed in the process of this invention for purifying furfural give a product containing water in concentrations of about 4 to 6 per cent by weight. This is the water concentration in furfural that is preferable for the solvent extraction of butadiene. Therefore, the resultant purified furfural is particularly applicable to the solvent extraction of butadiene.

Figure 1:
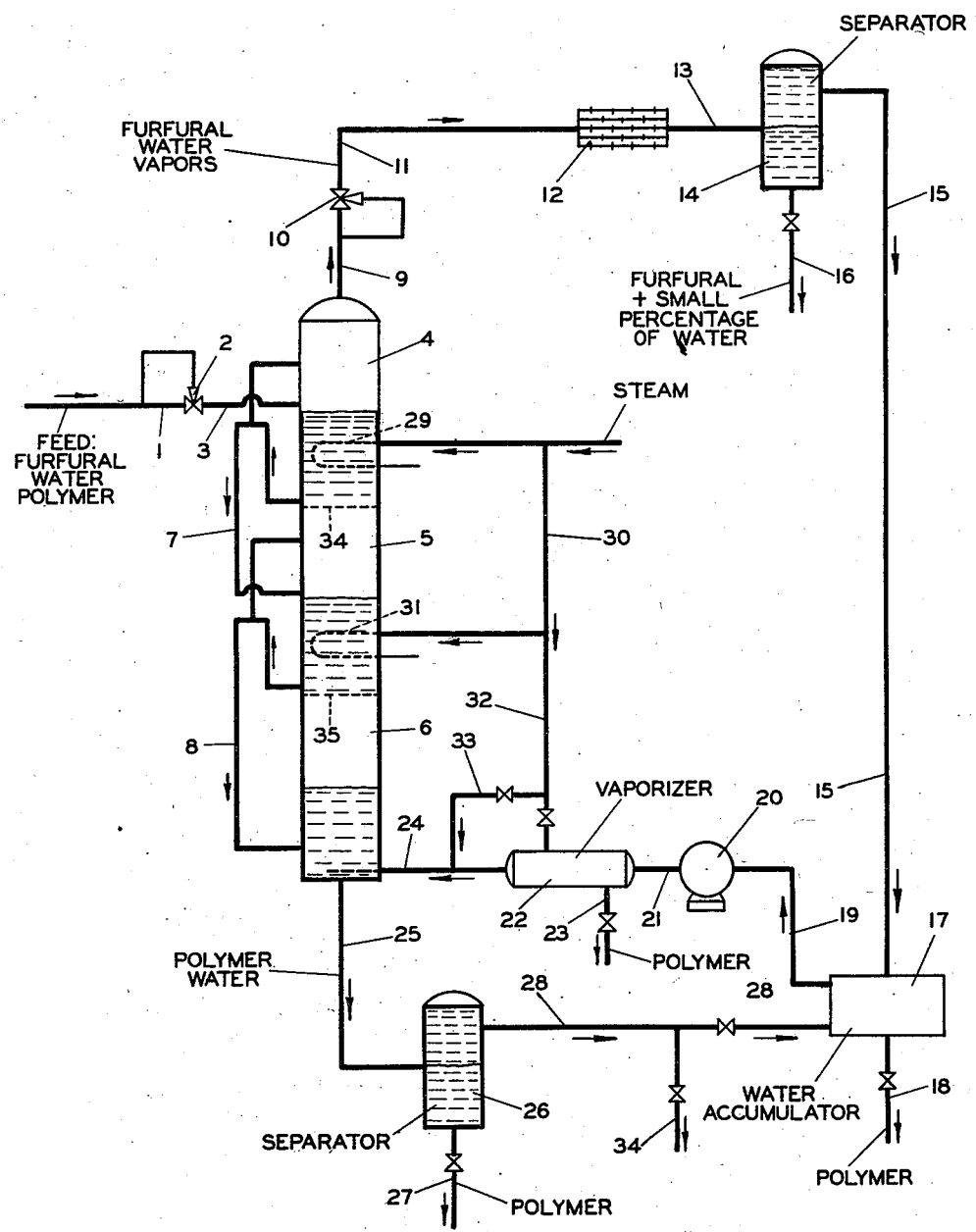
Fig. 1 is a diagrammatic representation of one arrangement of equipment suitable for carrying out the present invention and wherein the units comprise a column or tower.

Referring now to Fig. 1 of the drawings, the tower, which is shown in vertical cross-section, consists of sections 4, 5, and 6. Each section is separated from the other by means of perforated plates 34 and 35 which readily permit water vapor and vaporized furfural to pass upward but do not readily permit the downward drainage of furfural so long as vapors are rising. Each section, except the last, is supplied with reboil heat in the form of coils 29 and 31 heated indirectly by live steam. Live steam is supplied directly into the last section via line 24. The temperature of the reboilers and the live steam are so adjusted that the highest temperature is attained in the top and the lowest in the bottom of the column. Each section is interconnected with the section above it by means of overflow devices 7 and 8 in such manner that the product that overflows from the top section into the next lower section, and so on, is drawn off immediately above the tray 34 or 35 separating it from the next lower section of the column. Thus, the overflow is from the bottom of the liquid column that builds up on each tray. The net result is that the polymer concentration increases from the top to the bottom section of the column.

The feed which contains furfural, furfural polymer, and usually water is admitted to the top section 4 of the column through line 1, valve 2 and line 3. Valve 2 is preferably a flow control valve. The liquid accumulates in this section of the column and at the same time it is brought into contact with the reboil arrangement 29. A relatively high temperature, usually about 295° F., is maintained in this section. A large percentage of the furfural is driven off overhead through line 9 leaving the heavier less readily volatilized portion of liquid on the tray. Simultaneously, steam rich with furfural vapors from the next lower section 5 of the column passes upwardly through tray 34 and through the liquid in section 4 to aid in the stripping operation. When a sufficiently high liquid level of furfural and polymer accumulates on tray 34 it overflows into the next lower section 5 of the column through overflow device 7 which withdraws liquid from the bottom of the liquid column in section 4 and introduces it just above tray 35 in the succeeding section 5.

The same operation is repeated in section 5, except that the reboil temperature is not as high as in 4, usually being 10 to 20° F. therebelow, and the steam coming up from the lower section 6 is not so heavily laden with furfural vapors and consequently has greater stripping power than in section 4 of the column. This makes it unnecessary to maintain as high a temperature in this section as in section 4 to obtain good separation of the furfural.

Any number of additional sections similar to sections 4 and 5, may be interposed after section 5, as required or desired, each preferably operating at a temperature lower than the preceding section to compensate for the increased concentration of polymer in such manner that decomposition of furfural and polymerization of furfural and decomposition of furfural polymer are prevented.

In the final section 6 which contains the liquid of highest polymer concentration live steam is introduced through line 24 and bubbled through the liquid polymer containing furfural. The steam being freshly introduced is a very effective stripping agent and essentially all of the furfural contained in the polymer can be removed at a temperature considerably lower than required in sections 5 and 4, usually around 240° F.

The polymer and any steam condensed in section 6 leaves by line 25 to enter settling zone 26 where the heavy polymer settles to the bottom and is withdrawn from the system by line 27. The water layer collects on top and is withdrawn through line 28 to enter water accumulator 17 provided with line 18 for intermittently withdrawing any heavy polymer that may have carried over from settling tank 26. The water that accumulates in accumulator 17 contains small percentages of furfural. By means of line 19, pump 20, and line 21 the water from accumulator 17 is fed to a vaporizer 22 which supplies the steam for the bottom section 6 of the column. Thus, the water, containing small amounts of dissolved furfural, that is required to carry out the purification process, is continuously recycled through the system to prevent the loss of furfural that would otherwise be incurred if it were removed from the system and replaced with fresh water. Vaporizer 22 and line 24 are provided with connections to line 32 and 33, respectively, for introducing steam from an external source to replace any water lost or discharged from the system. Vaporizer 22 is also provided with line 23 for the removal of any polymer either formed therein or carried over from accumulator 17.

The overhead product from the column comprised of sections 4, 5, and 6 leaves via line 9 through valve 10 to enter line 11. Valve 10 is preferably a pressure responsive valve for maintaining the working pressure on the column. From line 11 the overhead product passes through cooler 12 where it is condensed and cooled enough to bring about the separation of two liquid phases, one rich in water and the other rich in furfural. The liquid is conducted from cooler 12 through line 13 and allowed to settle in separator 14 where furfural is withdrawn from the system at the bottom through line 16 and water along with dissolved furfural is taken off at the top through line 15 into water accumulator 17. The furfural taken off through line 16 from separator 14 is the purified product and contains about 4 to 6 per cent by weight of water, depending upon the temperature at which the accumulator is operated which determines the solubility of water in furfural. The purified furfural may be sent to storage, used in process steps, etc.

Figure 2:
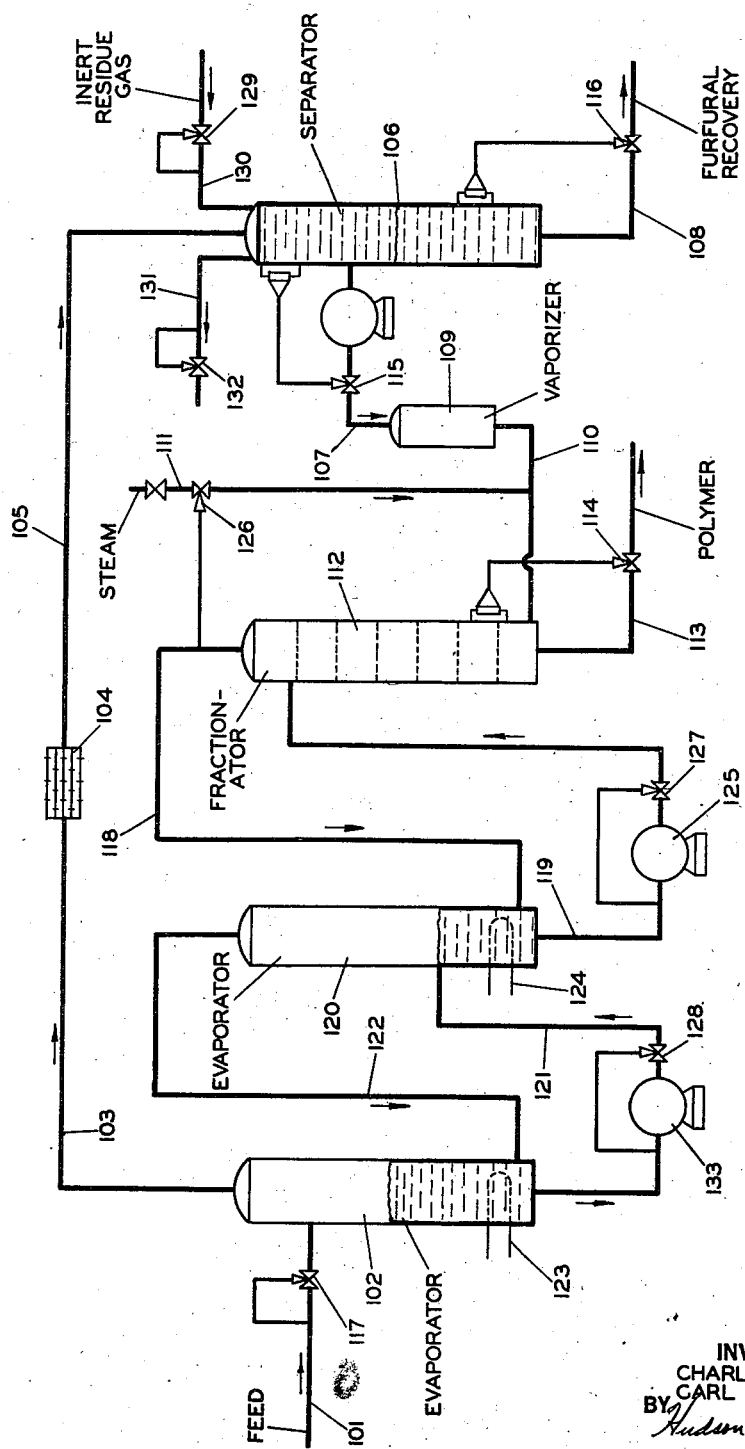
Fig. 2 is a similar representation of another arrangement of equipment and differs from Fig. 1 in that the several fractionation zones are distinctly separate from one another instead of being housed in a single column as in Fig. 1.

In Fig. 2 the portions corresponding essentially to the sections 4, 5 and 6 of the column in Fig. 1 are shown as separate units mounted individually rather than one on top of the other. The principle of operation is practically the same as that described in connection with Fig. 1. The feed enters evaporator 102 through line 101 and flow controller 117 where it is heated by reboil arrangement 123. Furfural, and water containing traces of polymer are removed overhead from evaporator 102 through line 103 and cooler 104 to enter separator 106 via line 105. In separator 106 a furfural rich and a water rich phase separate. The purified furfural containing relatively small amounts of polymer and water is removed from the bottom of separator 106 through line 108 and liquid level controller 116 to be withdrawn from the system.

The operating pressure on separator 106 is maintained by introducing an inert gas, such as a residue gas, under pressure through line 130 and rate of flow controller 129. When this process is used in connection with a butadiene recovery plant the residue gas, comprised mostly of hydrogen and other light hydrocarbons not appreciably soluble in furfural, for maintaining pressure on separator 106 may be obtained from the butadiene plant. In case the pressure reaches too high a value the residue gas is vented through line 131 and pressure controller 132. The use of residue gas to maintain a slight positive pressure on separator 106 serves to exclude the possibility of air getting into the system and promoting polymer formation. The water rich phase in